(12) United States Patent
Groenjes et al.

(10) Patent No.: US 10,373,246 B1
(45) Date of Patent: Aug. 6, 2019

(54) METHOD AND APPARATUS OF PROVIDING ENHANCED AUTHENTICATION AND SECURITY FOR FINANCIAL INSTITUTION TRANSACTIONS

(75) Inventors: Jason H. Groenjes, Omaha, NE (US); Michael P. Brown, Omaha, NE (US); Gerald M. Price, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 908 days.

(21) Appl. No.: 13/312,019

(22) Filed: Dec. 6, 2011

(51) Int. Cl.
*G06Q 40/00* (2012.01)

(52) U.S. Cl.
CPC .................................. *G06Q 40/00* (2013.01)

(58) Field of Classification Search
CPC .............................. G06Q 40/00; G06Q 20/00
USPC ....................................................... 705/35–45
See application file for complete search history.

(56) References Cited

U.S. PATENT DOCUMENTS

| | | | | |
|---|---|---|---|---|
| 7,548,886 B2* | 6/2009 | Kirkland et al. | | 705/44 |
| 7,669,759 B1* | 3/2010 | Zettner | | G06Q 20/40 |
| | | | | 235/380 |
| 7,866,544 B1* | 1/2011 | Block | | G06Q 20/18 |
| | | | | 235/379 |
| 7,992,777 B1* | 8/2011 | Block | | G06Q 20/18 |
| | | | | 235/379 |
| 8,041,338 B2* | 10/2011 | Chen et al. | | 455/407 |
| 8,127,983 B1* | 3/2012 | Block | | G07F 19/20 |
| | | | | 235/379 |
| 8,186,578 B1* | 5/2012 | Block | | G06Q 20/18 |
| | | | | 235/379 |
| 8,261,976 B1* | 9/2012 | Block | | G06Q 20/18 |
| | | | | 235/379 |
| 8,321,913 B2* | 11/2012 | Turnbull | | H04L 63/0492 |
| | | | | 726/2 |
| 2003/0182194 A1* | 9/2003 | Choey | | G06Q 20/04 |
| | | | | 705/16 |
| 2005/0278222 A1* | 12/2005 | Nortrup | | 705/17 |

(Continued)

FOREIGN PATENT DOCUMENTS

WO WO-2006103387 A1 * 10/2006 ......... H04L 63/0492

OTHER PUBLICATIONS

Kitten, Tracy, "GPS: The Future of Authentication'?", Aug. 2, 2010, Bank Info Security, 3 pages, <http://www.bankinfosecurity.com/blogs/gpsfutureauthenticationp645>.*

(Continued)

*Primary Examiner* — Kirsten S Apple
(74) *Attorney, Agent, or Firm* — Raffi Gostanian

(57) ABSTRACT

Example embodiments of the present invention may include a method and apparatus configured to authenticate a user transaction (e.g., point-of-sale, ATM transactions, etc.). One example method may include receiving user authentication information during the user transaction and confirming the user authentication information is correct. The method may also include determining a current user location by a location associated with the user's mobile device, and comparing the current user location to a known location of an entity associated with the user transaction. The method may also include authenticating the transaction if the current user location is within a predetermined distance of the known location of the entity associated with the user transaction.

20 Claims, 5 Drawing Sheets

(56) References Cited

U.S. PATENT DOCUMENTS

| | | | | |
|---|---|---|---|---|
| 2007/0184818 A1* | 8/2007 | Clough | ................ | G06O 30/06 |
| | | | | 455/411 |
| 2008/0035725 A1* | 2/2008 | Jambunathan | ......... | G06Q 20/32 |
| | | | | 235/380 |
| 2008/0071629 A1* | 3/2008 | Benson et al. | ................ | 705/26 |
| 2009/0206157 A1* | 8/2009 | Heffez | ................ | G06Q 20/32 |
| | | | | 235/382 |
| 2009/0259588 A1* | 10/2009 | Lindsay | ........................ | 705/40 |
| 2010/0082490 A1* | 4/2010 | Rosenblatt | ............. | G06Q 20/32 |
| | | | | 705/64 |
| 2010/0138297 A1* | 6/2010 | Fitzgerald et al. | ........ | 705/14.53 |
| 2011/0022517 A1* | 1/2011 | Hammad | ............... | G06Q 20/12 |
| | | | | 705/44 |
| 2011/0137804 A1* | 6/2011 | Peterson | ............. | G06Q 20/085 |
| | | | | 705/77 |
| 2011/0191243 A1* | 8/2011 | Allen | ............... | G06Q 10/06315 |
| | | | | 705/43 |
| 2011/0238573 A1* | 9/2011 | Varadarajan | ....... | G06Q 20/1085 |
| | | | | 705/43 |
| 2012/0303448 A1* | 11/2012 | Psillas | ................... | G06Q 40/02 |
| | | | | 705/14.49 |

OTHER PUBLICATIONS

Sharma, Seema, "Location Based Authentication", (2005). University of New Orleans Theses and Dissertations. 141. http://scholarworks.uno.edu/td/141 (Year: 2005).*

* cited by examiner

METHOD AND APPARATUS OF PROVIDING ENHANCED AUTHENTICATION AND SECURITY FOR FINANCIAL INSTITUTION TRANSACTIONS

TECHNICAL FIELD OF THE INVENTION

This invention relates to a method and apparatus of enhancing security for financial institutions and related entities by requiring additional measures to validate a user's financial transaction.

BACKGROUND OF THE INVENTION

Identity theft and fraudulent user transactions continue to grow as a problem facing financial institutions. Fraudulent transactions cost banks and other financial institutions large sums of money every year. Currently, authentication measures including signing credit card receipts, using 4-digit personal identification number (PINs), providing CCV codes with credit card purchases, submitting zip code information, etc., have all been used to reduce the likelihood of conducting a fraudulent transaction. However, additional measures are still needed to reduce fraud and illegal financial transactions.

SUMMARY OF THE INVENTION

An example embodiment may provide a method of authenticating a user transaction. The method may include receiving user authentication information during the user transaction. The method may also include confirming the user authentication information is correct and determining a current user location by a location associated with the user's mobile device. The method may also include comparing the current user location to a known location of an entity associated with the user transaction and authenticating the transaction if the current user location is within a predetermined distance of the known location of the entity associated with the user transaction.

Another example embodiment may include an apparatus configured to authenticate a user transaction. The apparatus may include a receiver configured to receive user authentication information during the user transaction. The apparatus may also include a processor configured to confirm the user authentication information is correct and determine a current user location by a location associated with the user's mobile device. The processor may also compare the current user location to a known location of an entity associated with the user transaction, and authenticate the transaction if the current user location is within a predetermined distance of the known location of the entity associated with the user transaction.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
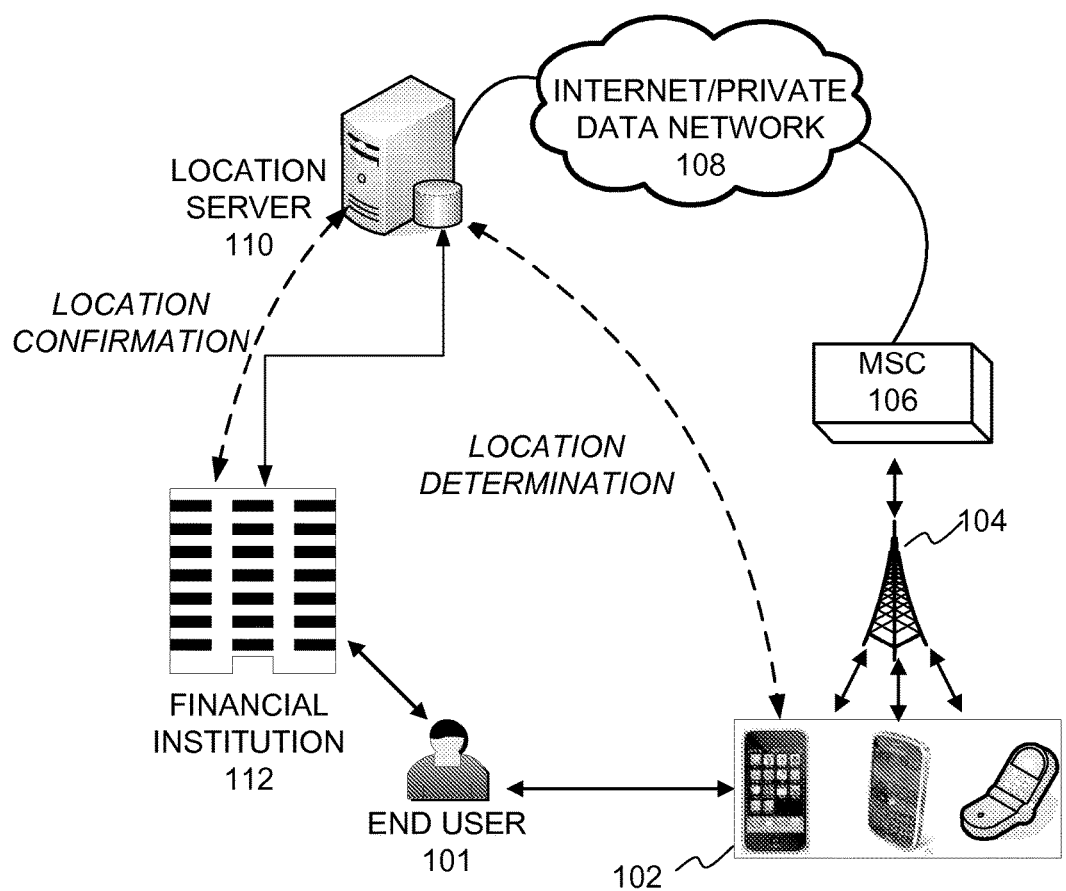
FIG. 1 illustrates an example network configuration according to example embodiments of the present invention.

FIG. 1 illustrates an example communication network according to example embodiments. Referring to FIG. 1, a communication network 100 includes an end user 101 accessing a financial institution 112 via an in-person transaction (e.g., ATM transaction, such as a monetary withdrawal transaction, deposit transaction, etc.) via a mobile station 102. The end user 101 may be carrying a mobile station (e.g., cell phone, smartphone, web-enabled phone, etc.) 102 that is in communication with a base station 104 and mobile switching center 106.

Adding another layer of user authentication protection beyond personal information and credit card or ATM card information may be provided by a smartphone authentication algorithm and/or application. In one example, if someone steals an ATM card and identity information of another person, a near-field communication (NFC) layer of protection may be used to ensure the user attempting a purchase transaction or ATM withdrawal also has a smartphone authorized for the user's card. In one example, the dual protection measures allow a user to call and shut-off a smartphone authentication feature in case the smartphone is stolen or missing. Also, the location of the smartphone may be tracked via triangulation, e-911 power estimation techniques, GPS enabled tracking, etc., which would discourage a thief from stealing a smartphone out of fear of being located by the authorities.

According to example embodiments of the present invention, a two-factor approach may be used to combine a NFC authentication procedure with a basic user information authentication procedure (e.g., signature, PIN number, CCV codes, zip code, etc.). The NFC authentication may be performed by determining the user's smartphone position via GPS, triangulation, and other cell phone location estimation techniques. The retailer point-of-transaction (POS) or ATM device may have its own NFC authentication measures to ensure the purchaser holding the credit card also has their smartphone present to authorize the card holder and the smartphone holder together. This may be performed by ensuring the purchaser is the same person on both the card and the mobile phone accounts.

According to one example, an automated teller transaction (ATM) may be conducted with or without the two-factor security approach. For instance, ATMs generally impose a limit on the amount of money that may be withdrawn at any given time. Such limits on cash withdrawals protect the bank and the customer from fraudulent transactions. By limiting the amount of cash one may with withdraw at one time, customers may be protected from theft and users of stolen cards. However, in some circumstances, the customer may desperately need more than the $300 or $500 daily limit imposed.

The two-factor approach to incorporating the NFC security factor with the already imposed user security information factor (e.g., PIN number, username, password, etc.), provides options for the customer. For example, if the customer is unable to produce a NFC confirmation via his or her smartphone presence, then the customer may only be able to conduct a default or fundamental banking transaction (i.e., limited funds withdrawal). However, if the customer is able to confirm their PIN number and confirm their NFC location-aware presence, then the ATM transaction types may include higher cash withdrawal limits since the level of authorization for the user account has been elevated.

The end user 101 may approach the financial institution 112 with his or her smartphone 102 present. The smartphone's location may be instantly identified by a GPS location determination algorithm via communication with the user's base station 104 and local mobile switching center (MSC) 106. The user's present location may be identified and stored in a location server memory 110. Communication may be provided over the Internet or a private data network 108. The user's location may be periodically updated and stored for subsequent authentication purposes. The instant that the end user 101 accesses the ATM at the financial institution 112, the location authentication procedure may determine the user's present location and the location of the ATM. The ATM may be located by a pre-stored identification procedure that correlates the ATM by an identification number or address with a pre-stored location. The location information of the ATM may then be compared to the location information of the user's smartphone. A determination may be made that the smartphone location is the same as the ATM if the location between the two is less than a certain distance (e.g., 100 feet or less, 20 feet or less, etc.).

In addition to the use of a smartphone, other position tracking tools may be used to track a card holder's true position and update that information accordingly. For example, a vehicle position tracking technology may be used to maintain accurate and updated user position information (e.g., vehicle GPS, OnStar®, etc.). A user's car may be parked within 20 feet of an ATM and may provide location authentication to prove that the proximity of the user is within an acceptable distance threshold (i.e., 10 feet) which may be required to authorize the ATM transaction. In this example, the user position tracking may be performed independent of a smartphone.

Figure 2:
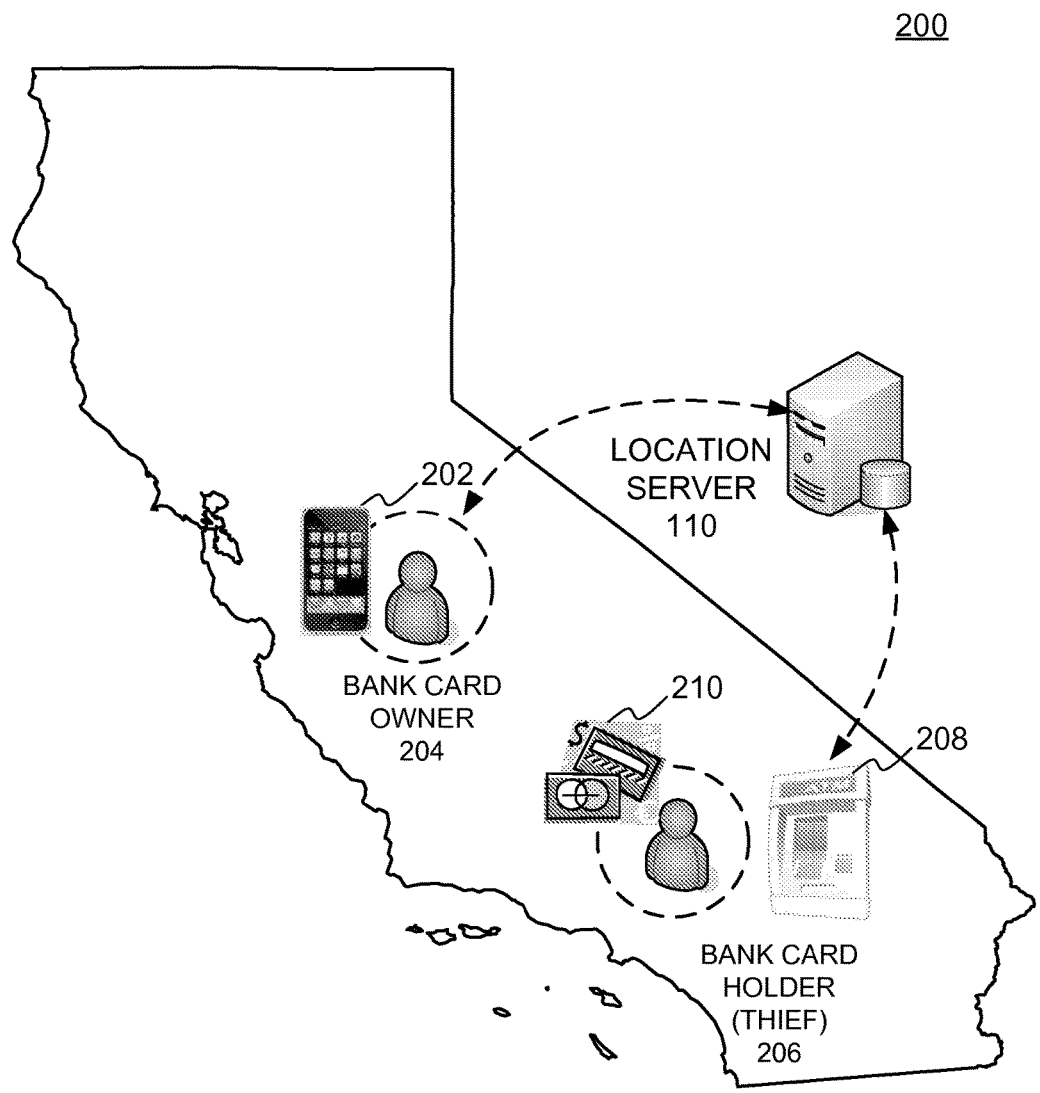
FIG. 2 illustrates an example geographical location determination security measure according to example embodiments of the present invention.

FIG. 2 illustrates an example location tracking algorithm according to example embodiments. Referring to FIG. 2, a geographical area of California is illustrated as being part of an example multi-factor authentication procedure 200. A bank card owner 204 may operate a smartphone 202 that performs location determination operations via GPS or triangulation, etc. The user's location may be identified and stored in memory at the location server 110. In this example, the bank card owner 204 may have his or her bank card or ATM card 210 and PIN number stolen via physical theft or identity theft. The thief 206 may move the ATM card 210 to a location that is different from the location of the bank card owner's smartphone. For example, the thief 206 may steal the card 210 and approach an ATM 208 in an entirely different city in California than the present city location of the card owner 204, as determined by the present location of the card owner's smartphone or other mobile device registered as a location-aware security authentication device with the owner's bank. The ATM 208 may accept the card and PIN number entered by the thief 206. However, the ATM may require a third party authorization from a smartphone application used to maintain position information of the smartphone 202 and the location information of the ATM 208. In this example, since the thief does not own and operate the smartphone 202, the ATM 208 will not be able to authenticate the smartphone's nearby proximity. The ATM 208 may not authorize any transactions or limit the withdrawal amount to less than a predefined dollar amount (e.g., $200 or less over a 24 hour period).

In another example, a user may enroll his or her smartphone with a financial institution system by providing a cell phone number and/or a unique phone international mobile equipment identity (IMEI) associated with the mobile smartphone. The financial institution may accept and register that information with an account number for future transactions. The financial institution may perform a home location register (HLR) location "dip" by prompting the pre-enrolled user during an ATM transaction to provide the second form of authentication and confirm their smartphone is present. Alternatively, the user could be randomly located without telling the user to determine the user's location prior to conducting a financial transaction.

According to another example, a credit transaction may have recently occurred on someone's credit card about five hours ago, the bank may be able to query the HLR to perform a dip on a particular international mobile equipment identity (IMEI) pre-registered to the user during the time frame the user transaction was performed. If the location associated with the recent HLR records indicate that the location of mobile device and the location of the transaction match, there is a much lower risk of fraud with that particular transaction.

Figure 3:
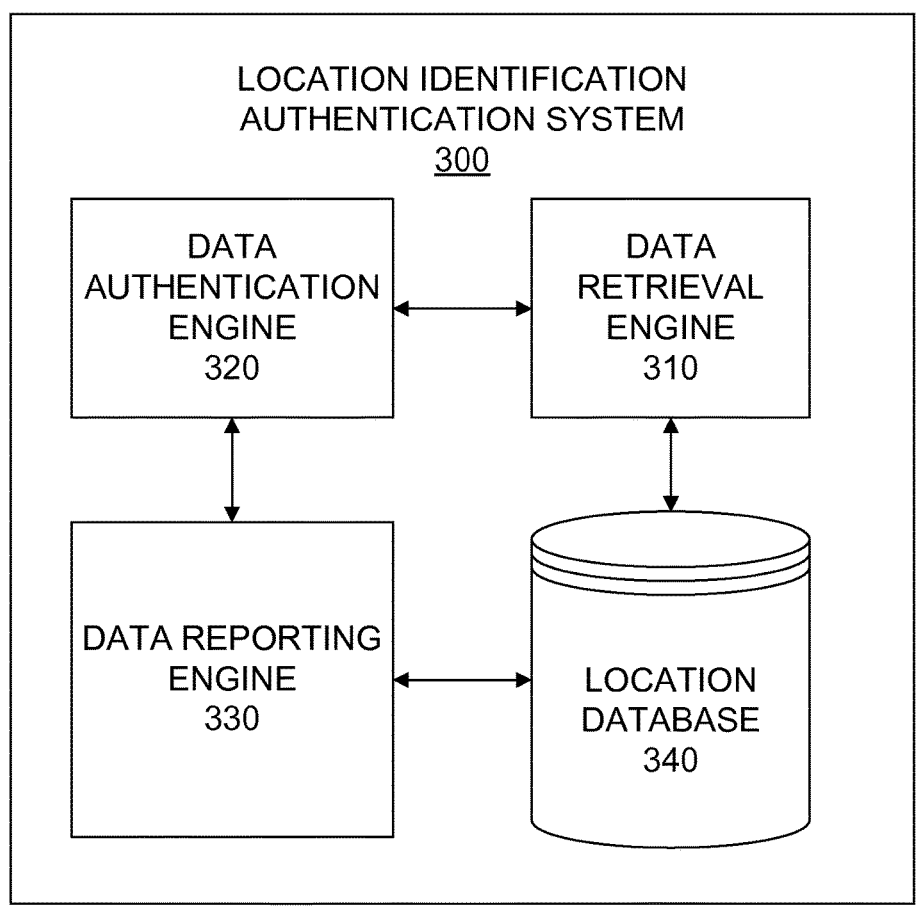
FIG. 3 illustrates a system diagram of a network entity configured to provide one or more security operations related to the example embodiments of the present invention.

FIG. 3 illustrates an example location determination authentication system 300 according to example embodiments. Referring to FIG. 3, a location database 340 may store user location information based on a location of the user's mobile device (e.g., tablet computing device, smartphone, cell phone, etc.). In operation, when a user approaches a business entity (e.g., retailer, bank ATM, etc.), the user may begin by presenting a personal credit card or bank card for a first form of authorization. The system may receive user authentication information during the user transaction, such as, card information, PIN number, etc. The system may authenticate the user information and confirm the user authentication information is correct. Next, the system may determine a current user location by a location associated with the user's mobile device by referencing the location database 340. The system may compare the current user location to a known location of an entity associated with the user transaction. For example, the ATM may have a predefined location that is known and stored in the location database 340. The system may authenticate the transaction if the current user location is within a predetermined distance of the known location of the ATM associated with the user transaction. Information in the location database 340 may be correlated with the user's mobile device and the ATM location.

The data retrieval engine 310 may retrieve the user location information and the data authentication engine 320 may authenticate the information by correlating the user's mobile device position with the location of the ATM location or other entity. The data reporting engine 330 may provide a confirmation or authorization based on the results of the location correlation. The current user location may be determined by GPS, triangulation or any other known mobile device position determination algorithm. The current user location may be performed after the user authentication information is received in response to the initiation of a new transaction. Alternatively, the current user location may be determined prior to the user authentication information being received. For example, by identifying a plurality of location positions of the user prior to the user transaction, the user's location may be already known before the transaction is performed. In this case, a plurality of location positions of the user may be obtained and logged in the location database 340 over a period of time leading up to the transaction. One or more of the user location positions may be identified and compared to the known location of the entity associated with the user transaction. The transaction may be authenticated if at least one of the plurality of location positions is within a predetermined distance of the known location of the entity associated with the user transaction (e.g., 100 feet or less) and/or within a predetermined amount of time lapse (e.g., recent time window of 10 minutes or less). In the event that the current user location is not within a predetermined distance of the known location of the entity associated with the user transaction, then certain predefined functions specified by a user application operating on the user's mobile device may be disabled. For example, the user may setup a series of options to create their own customized security options (e.g., only allow $100 withdrawal if the mobile device location position cannot be matched to the ATM location, etc.).

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of the other figures.

Figure 4:
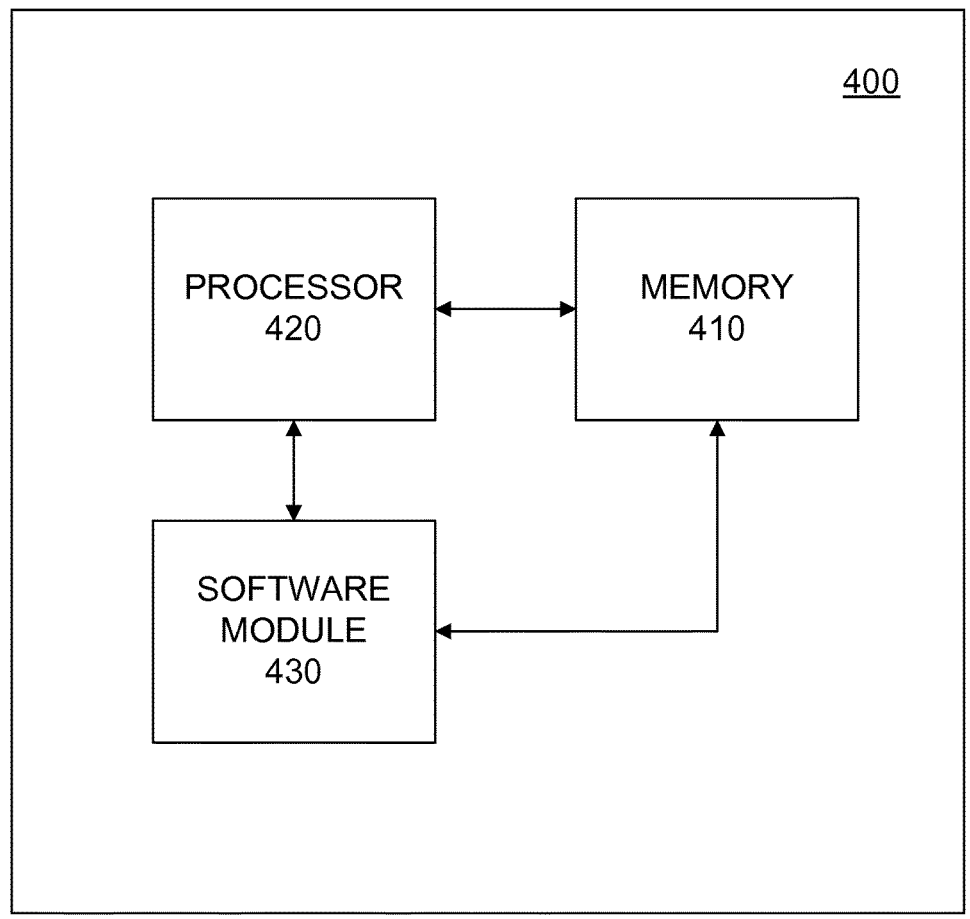
FIG. 4 illustrates a network entity that may include memory, software code and other computer processing hardware, and which may be configured to perform operations according to example embodiments of the present invention.
Figure 5:
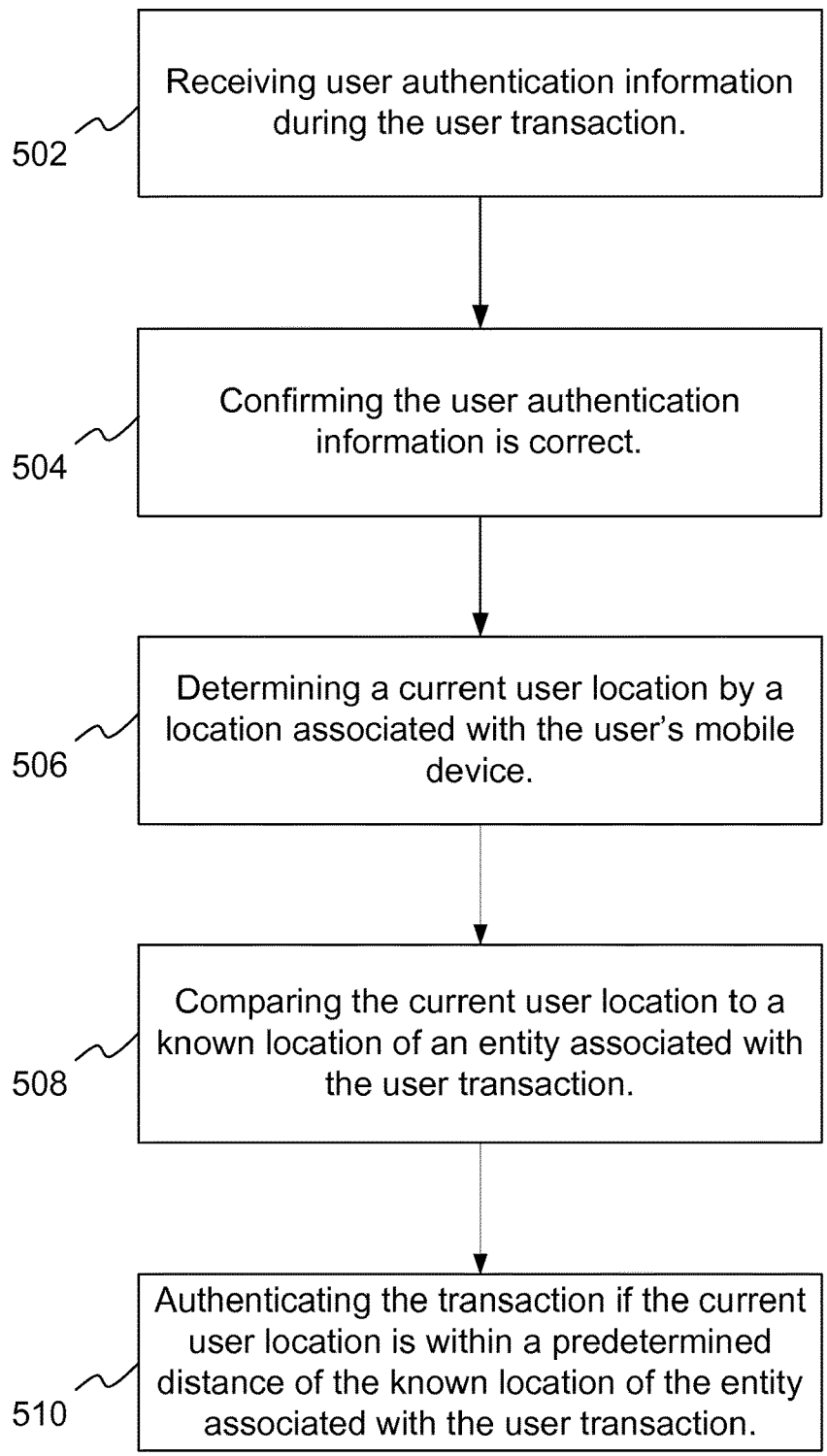
FIG. 5 illustrates a flow diagram corresponding to an example embodiment of the present invention.

As illustrated in FIG. 4, a memory 410 and a processor 420 may be discrete components of the network entity 400 that are used to execute an application or set of operations.

The application may be coded in software in a computer language understood by the processor 420, and stored in a computer readable medium, such as, the memory 410. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

One example embodiment may include a method of authenticating a user transaction. The method may include receiving user authentication information during the user transaction at operation 502. Authentication information may include a username, password, PIN number, zip code, etc. The method may also include confirming the user authentication information is correct at operation 504. The method may further include determining a current user location by a location associated with the user's mobile device at operation 506. The location information may be determined prior to or responsive to the user transaction being conducted. The method may further include comparing the current user location to a known location of an entity associated with the user transaction at operation 508. The method may also include authenticating the transaction if the current user location is within a predetermined distance of the known location of the entity associated with the user transaction at operation 510.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of authenticating a user transaction, the method comprising:

receiving, via an authenticating computing device, first user authentication information of a first type from a user during the user transaction;

receiving, via a receiver of an authenticating computing device, and from a mobile device of the user, second user authentication information, of a second type different than the first type, during the user transaction;

confirming, via a processor, the second user authentication information is correct;

performing at least one of triangulation and global positioning via communication with a base station communicating with the mobile device to determine a current location of the mobile device;

comparing the location of the mobile device to a known location of an entity associated with the user transaction;

identifying a plurality of location positions of the mobile device prior to the user transaction;

logging the plurality of location positions of the mobile device by periodically updating location information of the mobile device in a location database over a predetermined amount of time prior to the user transaction;

comparing the plurality of location positions of the mobile device to the known location of the entity associated with the user transaction;

performing, via the authenticating computing device, a first authentication of the user transaction based on the first user authentication information; and performing, via the authenticating computing device, a second authentication of the user transaction based on the second user authentication information, wherein the second user authentication information includes information identifying a current location of the mobile device with respect to at least one of the plurality of location positions, wherein, in response to the first authentication being successful and the second authentication indicating that the at least one of the plurality of location positions of mobile device are within a predetermined distance of the known location of the entity associated with the user transaction, then remotely controlling a first level of access granted to the user for the user transaction, and in response to the first authentication being successful and the second authentication not indicating that the at least one of the plurality of location positions of mobile device are within a predetermined distance of the known location of the entity associated with the user transaction, then remotely controlling a second level of access, less than the first level of access, is granted to the user for the user transaction.

2. The method of claim 1, wherein determining the current user mobile device location is performed via GPS.

3. The method of claim 1, wherein determining the current user mobile device location is performed via triangulation.

4. The method of claim 1, wherein determining the current user mobile device location is performed after the user authentication information is received.

5. The method of claim 1, wherein determining the current user mobile device location is performed prior to the user authentication information being received.

6. The method of claim 1, further comprising:
authenticating the user transaction if at least one of the plurality of location positions was identified within the predetermined amount of time, and if the user authentication information is correct.

7. The method of claim 1, wherein if the current user mobile device location is not within a predetermined distance of the known location of the entity associated with the user transaction, then disabling predefined functions specified by a user application operating on the mobile device.

8. An apparatus configured to authenticate a user transaction, the apparatus comprising:
a receiver configured to receive, during a user transaction, both first user authentication information of a first type from a user, and second user authentication information, of a second type different than the first type, from a mobile device associated with the user; and
a processor configured to:
confirm the second user authentication information is correct,
perform at least one of triangulation and global positioning via communication with a base station communicating with the mobile device to determine a current location of the mobile device,
compare the location of the mobile device to a known location of an entity associated with the user transaction,
identify a plurality of location positions of the mobile device prior to the user transaction,
log the plurality of location positions of the mobile device by periodically updating location information of the mobile device in a location database over a predetermined amount of time prior to the user transaction,
compare the plurality of location positions of the mobile device to the known location of the entity associated with the user transaction,
perform a first authentication of the user transaction based on the first user authentication information; and
perform a second authentication of the user transaction based on the second user authentication information, wherein the second user authentication information includes information identifying a current location of the mobile device with respect to at least one of the plurality of location positions, wherein,
in response to the first authentication being successful and the second authentication indicating that the at least one of the plurality of location positions of mobile device are within a predetermined distance of the known location of the entity associated with the user transaction, then remotely control a first level of access granted to the user for the user transaction, and
in response to the first authentication being successful and the second authentication not indicating that the at least one of the plurality of location positions of mobile device are within a predetermined distance of the known location of the entity associated with the user transaction, then remotely control a second level of access, less than the first level of access, is granted to the user for the user transaction.

9. The apparatus of claim 8, wherein the current user mobile device location is determined via GPS.

10. The apparatus of claim 8, wherein the current user mobile device location is determined via triangulation.

11. The apparatus of claim 8, wherein the current user mobile device location is determined after the user authentication information is received.

12. The apparatus of claim 8, wherein the current user mobile device location is determined prior to the user authentication information being received.

13. The apparatus of claim 8, wherein the processor is further configured to identify if at least one of the plurality of location positions was identified within the predetermined amount of time, and if the user authentication information is correct.

14. The apparatus of claim 8, wherein if the current user mobile device location is not within a predetermined distance of the known location of the entity associated with the user transaction, then the processor is further configured to disable predefined functions specified by a user application operating on the user's mobile device.

15. A non-transitory computer readable storage medium configured to store instructions that when executed by a processor cause the processor to perform authenticating a user transaction, the processor being further configured to perform:
receiving first user authentication information of a first type from a user during the user transaction;
receiving second user authentication, of a second type different than the first type, during the user transaction;
confirming the second user authentication information is correct;
performing at least one of triangulation and global positioning via communication with a base station communicating with the mobile device to determine a current location of the mobile device;
comparing the location of the mobile device to a known location of an entity associated with the user transaction;

identifying a plurality of location positions of the mobile device prior to the user transaction;

logging the plurality of location positions of the mobile device by periodically updating location information of the mobile device in a location database over a predetermined amount of time prior to the user transaction;

comparing the plurality of location positions of the mobile device to the known location of the entity associated with the user transaction;

performing, via the authenticating computing device, a first authentication of the user transaction based on the first user authentication information; and performing, via the authenticating computing device, a second authentication of the user transaction based on the second user authentication information, wherein the second user authentication information includes information identifying a current location of the mobile device with respect to at least one of the plurality of location positions, wherein, in response to the first authentication being successful and the second authentication indicating that the at least one of the plurality of location positions of mobile device are within a predetermined distance of the known location of the entity associated with the user transaction, then remotely controlling a first level of access granted to the user for the user transaction, and in response to the first authentication being successful and the second authentication not indicating that the at least one of the plurality of location positions of mobile device are within a predetermined distance of the known location of the entity associated with the user transaction, then remotely controlling a second level of access, less than the first level of access, is granted to the user for the user transaction.

16. The non-transitory computer readable storage medium of claim 15, wherein determining the current user mobile device location is performed via GPS.

17. The non-transitory computer readable storage medium of claim 15, wherein determining the current user mobile device location is performed via triangulation.

18. The non-transitory computer readable storage medium of claim 15, wherein determining the current user mobile device location is performed after the user authentication information is received.

19. The non-transitory computer readable storage medium of claim 15, wherein determining the current user mobile device location is performed prior to the user authentication information being received.

20. The non-transitory computer readable storage medium of claim 15, wherein the processor is further configured to perform:

authenticating the user transaction if at least one of the plurality of location positions was identified within the predetermined amount of time, and if the user authentication information is correct.

* * * * *